(No Model.)

S. A. BEMIS.
CAR WHEEL AND AXLE BOX.

No. 330,372. Patented Nov. 17, 1885.

WITNESSES:
J. D. Garfield
Henry A. Chapin

INVENTOR
Sumner A. Bemis
BY
Henry A. Chapin
ATTORNEY

UNITED STATES PATENT OFFICE.

SUMNER A. BEMIS, OF SPRINGFIELD, MASSACHUSETTS, ASSIGNOR TO THE BEMIS CAR BOX COMPANY, OF SAME PLACE.

CAR-WHEEL AND AXLE-BOX.

SPECIFICATION forming part of Letters Patent No. 330,372, dated November 17, 1885.

Application filed March 9, 1885. Serial No. 158,119. (No model.)

*To all whom it may concern:*

Be it known that I, SUMNER A. BEMIS, a citizen of the United States, residing at Springfield, in the county of Hampden and State of Massachusetts, have invented new and useful Improvements in Adapting Plain-Faced Car-Wheels for Use with Recessed Axle-Boxes, of which the following is a specification.

This invention relates to improvements applicable to car-wheels, whereby they are adapted to be used with certain descriptions of car-axle boxes, the object being to provide for the utilization of old car-wheels having a plain face on the side next to the journal of the axle for use with car-boxes which have a recess in their rear ends to receive a tubular projection on the adjoining side of the wheel, whereby the expense of new wheels is obviated when such boxes are applied to old running-gear.

Figure 1:
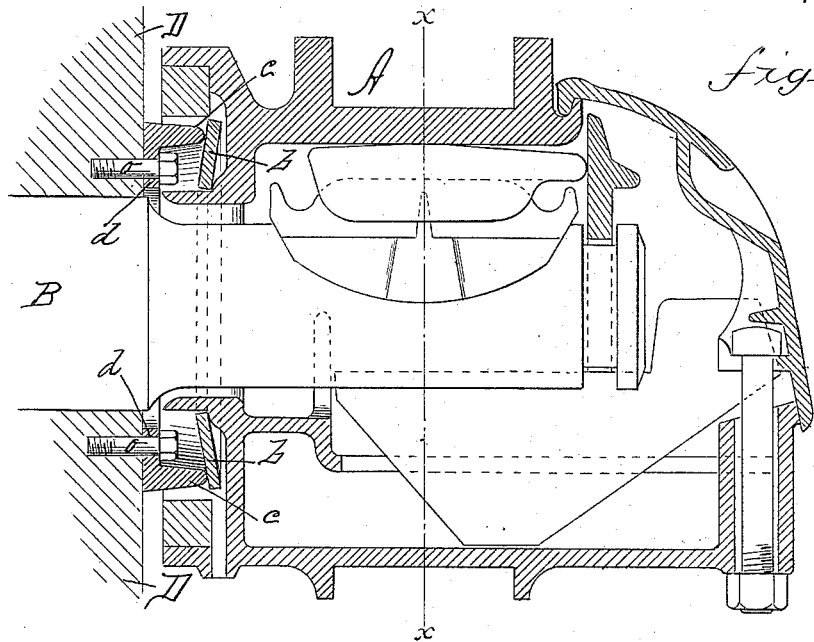
Figure 2:
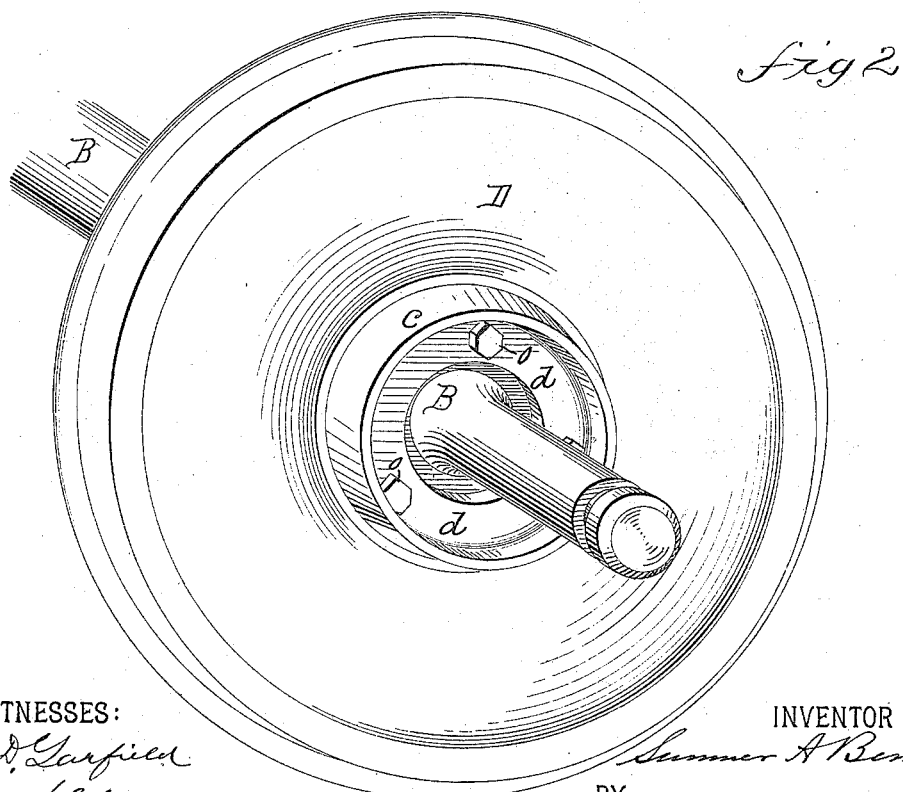

In the drawings forming part of this specification, Figure 2 is a perspective view of a car-wheel and one end of an axle, said wheel having my improvement applied thereto. Fig. 1 is a side elevation, partly in section, of a car-axle, an axle-box, and a part of a car-wheel, the latter having my improvements applied thereto and showing them in their relation to the axle-box.

In the drawings, A is the axle-box having a recess or chamber in the rear end thereof, in which is placed an elastic flat ring or washer, *b,* the said box occupying a position on the axle-journal as usual.

The car-wheel D is of that description having a flat or plain side next to the axle-journal, and consequently, without the improvement hereinafter described, is not capable of being used with said axle-box and of co-operating with the latter to exclude dust from the interior of the box, for it is essential that a wheel to be used with the latter should have a tubular projection thereon surrounding the axle and adapted to enter said recess in the rear end of the axle-box, and having its edge bearing against the side of the washer *b,* as shown in Fig. 1. Therefore, to adapt car-wheels already in use to be used in connection with the box A, and obviate the necessity of providing new wheels therefor, or for an axle-box having said recess or a similar one in its rear end, a flat ring, *d,* is cast or otherwise made, having thereon the tubular projection *c,* and the said ring is bolted onto the wheel D by bolts *o* in the position shown, thereby providing for use with said box a wheel as well adapted to be used therewith as though it had said projection *c* formed integral therewith.

What I claim as my invention is—

The combination, with external axle-box, A, having a recess at its rear end containing an elastic packing-ring, of the axle, the flat faced car-wheel on said axle, and a tubular piece, *c,* detachably secured to the flat face of the car-wheel and extending against the elastic ring, substantially as described.

SUMNER A. BEMIS.

Witnesses:
H. A. CHAPIN,
J. D. GARFIELD.